United States Patent [19]

Ulbrich

[11] Patent Number: 5,353,510
[45] Date of Patent: Oct. 11, 1994

[54] PROBE, MOTION GUIDING DEVICE, POSITION SENSING APPARATUS, AND POSITION SENSING METHOD

[76] Inventor: Klaus Ulbrich, Flanders, N.J.

[21] Appl. No.: 959,373

[22] Filed: Oct. 13, 1992

Related U.S. Application Data

[63] Continuation of Ser. No. 18,998, Feb. 26, 1987, Pat. No. 5,154,002.

[51] Int. Cl.⁵ ............................................. G01B 5/20
[52] U.S. Cl. ...................................... 33/502; 33/504; 33/558
[58] Field of Search .................. 33/502, 503, 504, 505, 33/558

[56] References Cited

U.S. PATENT DOCUMENTS

| | | | |
|---|---|---|---|
| 3,795,054 | 3/1974 | Kinney | 33/502 |
| 3,869,799 | 3/1975 | Neller et al. | |
| 4,078,314 | 3/1978 | McMurtry | |
| 4,364,178 | 12/1982 | Huet | 33/503 |
| 4,437,151 | 3/1984 | Hurt et al. | 33/503 |
| 4,523,450 | 6/1985 | Herzog | 33/503 |
| 4,530,159 | 7/1985 | Ernst | 33/503 |
| 4,663,852 | 5/1987 | Guarini | 33/503 |
| 4,703,443 | 10/1987 | Moriyasu | |
| 4,962,591 | 10/1990 | Zeller et al. | |

FOREIGN PATENT DOCUMENTS

| | | |
|---|---|---|
| 275428 | 7/1988 | European Pat. Off. |
| 202611 | 8/1989 | Japan. |

*Primary Examiner*—Thomas B. Will
*Attorney, Agent, or Firm*—Beveridge, DeGrandi, Weilacher & Young

[57] ABSTRACT

A probe is mounted on a machine head which has mobility and readouts in three linear coordinate directions. The probe carries a stylus with a tip which has mobility relative to the head in three nonlinear coordinate directions which are nonaligned with the axes of head movement. A mathematical model, produced by a calibration technique before measurements are taken, translates readouts of the stylus tip's position in the nonlinear coordinates into values which are aligned with the coordinate axis system of the machine head. The probe has three flex wire motion guiding devices connected together in series, and each of these devices has a second member movably supported on a first member by flexible wires arranged in two nonparallel sets of parallel wires. The second member is thus constrained to movement in a single arcuate path which lies transverse to the longitudinal axes of the wires in both sets. The distance of movement between the first and second members is sensed by a differential optical transducer which has two light source elements which emit light beams and two light sensor elements which receive these beams. The elements on each of the relatively movable members face in opposite directions so that movement between the members lengthens one beam and shortens the other beam. An electronic circuit compares signals from the light sensor elements and provides an output signal which indicates the position of the second member relative to the first member.

5 Claims, 3 Drawing Sheets

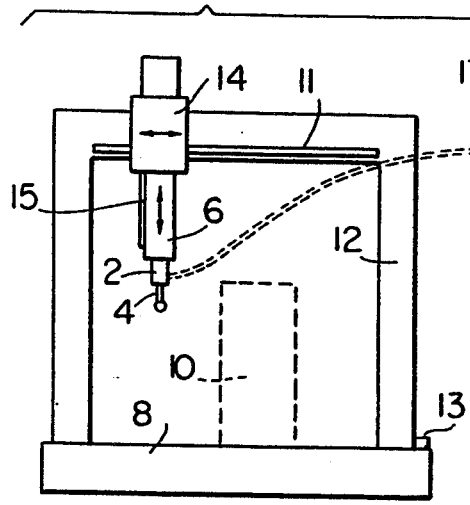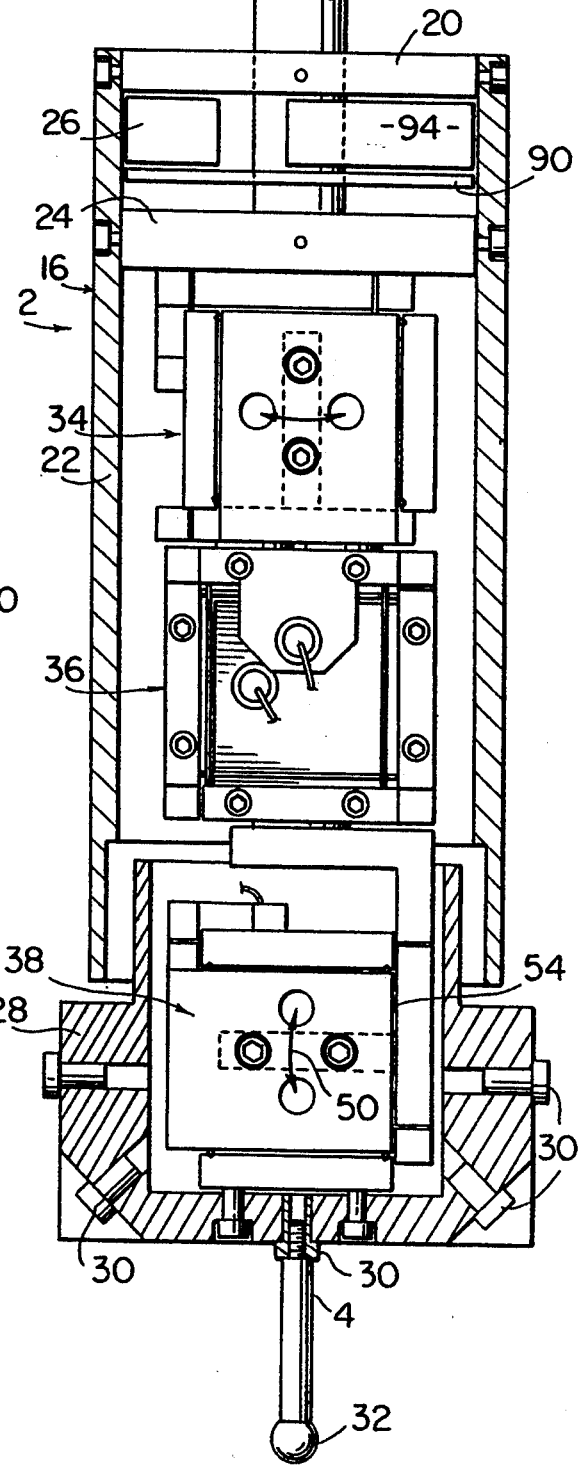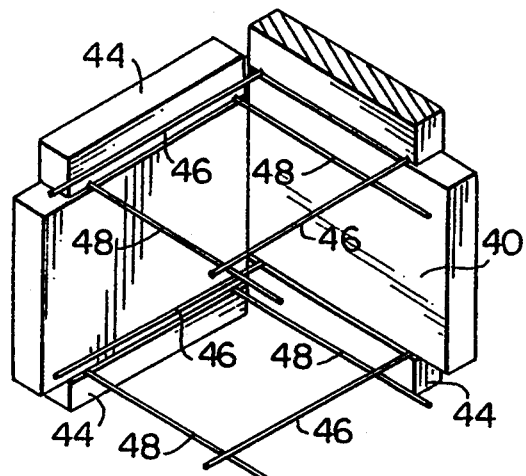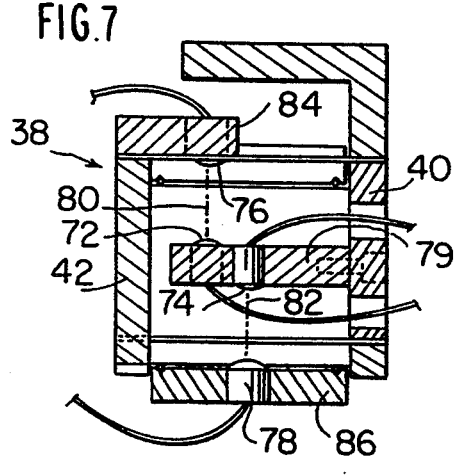

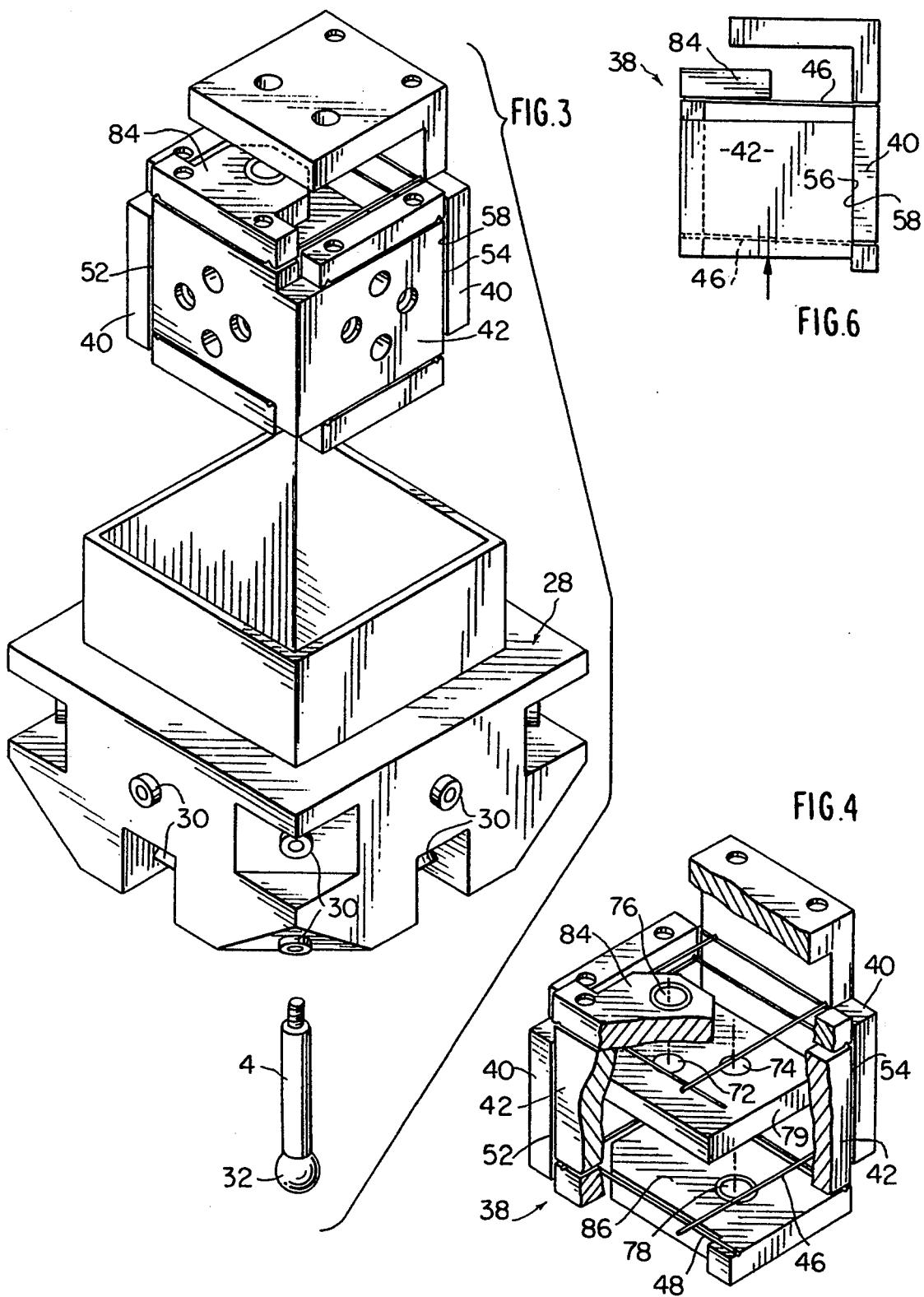

PROBE, MOTION GUIDING DEVICE, POSITION SENSING APPARATUS, AND POSITION SENSING METHOD

This application is a continuation of application Ser. No. 07/018,998, filed Feb. 26, 1987 now U.S. Pat. No. 5,154,002.

BACKGROUND OF THE INVENTION

This invention relates to improvements which are primarily applicable to the structure and use of coordinate measuring probes which are used with coordinate measuring machines.

The head of a coordinate measuring machine is usually movable along three mutually perpendicular linear axes. A probe is mounted on the head, the head is moved to a position where the tip of the probe stylus contacts the workpiece which is being studied, and the x, y and z coordinates of tile head's position are sensed and recorded. A series of such readings are obtained and analyzed to obtain measurements of the workpiece.

A prevalent type of probe presently in use is a touch trigger probe. Such a probe provides a signal when it contacts the workpiece, and this signal triggers the taking of readings which indicate the head's position.

Another type of existing probe is a coordinate measuring probe. The probe disclosed in this specification is a new probe in this category. In a coordinate measuring probe, the probe has internal parts which are relatively movable in order to enable the stylus tip to move relative to the head of the coordinate measuring machine, along three mutually perpendicular axes. When such a probe is used, the displacement of the stylus tip relative to the head is is added to or subtracted from the head's coordinate location in the three coordinate directions. In some prior coordinate measuring probes, the displacement of the stylus tip from a neutral or zero position is sensed by linear variable differential transformers ("LVDT") and, in others, there are optical transducers with scales which are read optically by photosensitive pulse-counting-devices.

The structure and use of earlier coordinate measuring probes have presented several sources of error. For example, a lack of parallellism between the axes of the coordinate measuring machine and the coordinate measuring probe will lead to errors, as will nonlinear movement within the probe along any ostensibly linear axis. Friction between relatively movable parts of the probe presents another source of error. Metrology experts, recognizing these potential error sources, have endeavored to reduce such errors, but these efforts have focused primarily on improvement of the accuracy of the components of the measuring probes with respect to distance measuring and linearity.

LVDTs inherently produce errors because their output signals are not linear, they have a limited measurement range, they are slow to provide readings when a probe is moving in a dynamic mode, they introduce friction or require lubrication due to the sliding movement of a core within a tube, and their obligatory linear motion imposes restraints on the mechanical design of a probe.

Some aspects of the present invention are based upon the recognition that accuracy does not require precise linear movement between the relatively movable members of a coordinate measuring probe, nor does accuracy require parallelism between the coordinate axes of the probe and the coordinate axes of the machine head. Rather, it is possible to obtain a high degree of accuracy by using a mechanism which provides precise repeatability, and a calibration technique which creates a mathematical model which is capable of translating readings taken along the probe's coordinate axis system into readings which are expressed in terms of tile machine's cordinate axis system. Accuracy is also enhanced by a novel movement guiding device which assures precise repeatability, and by a novel optical position sensing device which operates between relatively movable members within the probe.

Although the principal applicability of the invention is in association with coordinate measuring machines, it is envisioned that the features disclosed in this specification will be useful in other areas where measurements are made, for example, in machine tools such as milling machines, jig borers and the like.

SUMMARY

In one respect, the invention applies to a method and apparatus wherein a probe supporting head is movable along a first set of coordinate axes, and a probe is rigidly mounted on the head and provided with a stylus receiving mount which is movable relative to the head along a second set of coordinate axes. The axes in the first set are non-aligned with respect to the axes of the second set. The position indicating values provided by one of the sensing means along its set of coordinate axes is translated into position indicating values which lie on axes which are aligned with the other set of coordinate axes. The translating step may be performed by a computer or other suitable means.

From another perspective, the invention involves a motion guiding device and a probe which embodies such a device. In this device, a second member is connected to and relatively movable with respect to a first member. The connection between these members is provided by a plurality of elongated flexible connector elements which each have an elongated midportion and opposite end portions which are connected to the first member and the second member. These connector elements are arranged in two sets of parallel elements, and the elements in one set have their longitudinal axes nonparallel relative to the longitudinal axes of the elements in the other set. This arrangement restrains the movement of the second member relative to the first member to a single arcuate path which lies transverse to the longitudinal axes of the elements in both sets. To avoid excessive movement, the elements are preferably arranged so that they have mutually confronting surfaces which are normally spaced apart but are movable toward and into contact with each other when there is a predetermined distance of movement of the second member relative to the first member. Upon such contact, movement beyond said predetermined distance is prevented Also, it is preferred to connect three such motion guiding devices together in series so that their single arcuate paths are generally perpendicular to each other.

The invention also relates to a position sensing apparatus and to probes embodying such position sensors. The sensing apparatus has two optical devices, each of which has a light source element and a light sensor element. Each device has one of its elements mounted on a first member, and these are set at orientations where they face in opposite directions. Each device has its other element mounted on a second member, and these are also oriented in opposite directions. With this arrangement, relative movement between the first and second members shortens the optical beam of one optical device and lengthens the optical beam of the other optical device. Circuit means can be provided for comparing signals from the light sensors and providing an output signal which is indicative of the position of the second member relative to the first member.

Notwithstanding this brief summary, a number of further features of importance are disclosed in the following description and shown in the accompanying drawings.

BRIEF DESCRIPTION OF THE DRAWINGS

FIG. 1 is a diagramatic view showing the main components of a coordinate measuring machine with a probe and stylus mounted thereon.

FIG. 2 is an elevational view, partly in section, of a probe constructed according to the invention.

FIG. 3 is an exploded perspective view showing a single motion guiding device, a stylus receiving mount, and a motion guiding device which permits motion primarily in the direction of the z-axis.

FIG. 4 is another view of the z-axis mechanism which is broken away to show some of its interior workings.

FIG. 5 is a view similar to FIG. 3 but with additional components removed therefrom so as to show only one of the main members of the device, and the flex wires which are connected to it.

FIG. 6 is a diagrammatic side view which illustrates the manner in which the mechanism of the invention prevents relative movement beyond a predetermined distance.

FIG. 7 is a sectional view through the z-axis device showing the orientation and positioning of the components of the position sensing means.

DESCRIPTION OF A PREFERRED EMBODIMENT

Figure 8:
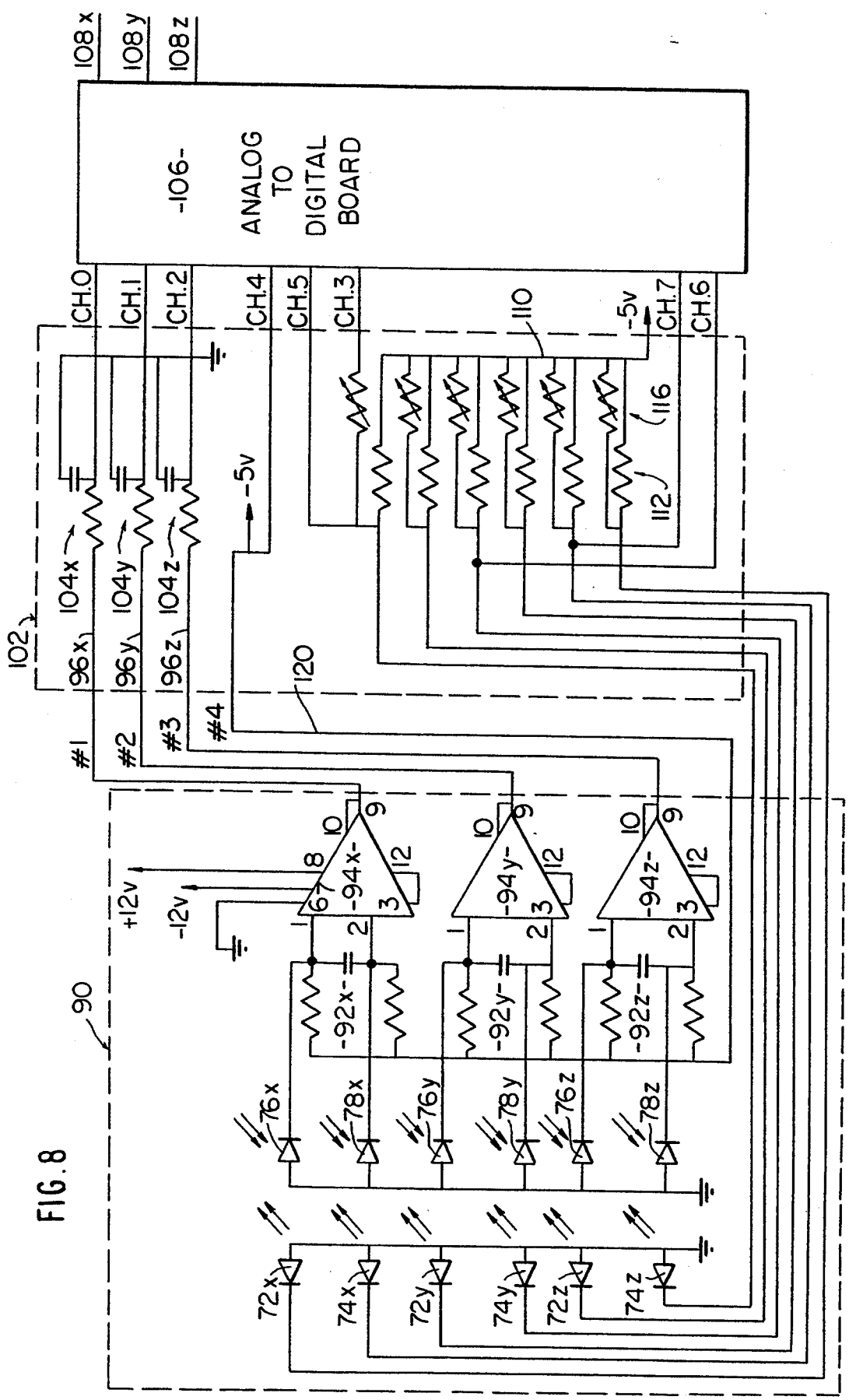
FIG. 8 is a circuit schematic of the apparatus.

FIG. 1 shows a coordinate measuring machine in which a probe 2 connects a stylus 4 to the head 6 of the machine. The machine has a base 8 for supporting the workpiece 10, and the head 6 is moved in three mutually perpendicular linear directions which enables the tip of the stylus 4 to contact the workpiece 10. Scales 11, 13 and 15 on the machine are readable visually or electronically to indicate the head position with respect to the linear directions of mobility, so it is possible to ascertain the probe's position in terms of the machine's coordinate axes. Probe movement in the y-axis direction, perpendicular to the plane of the paper in FIG. 1, is provided by a longitudinal carriage 12. Movement in the x-axis direction is provided by the transverse carriage 14; and, movement in the vertical z-axis direction is provided by the connection between the head 6 and the carriage 14. To this extent, the measuring machine is conventional.

The probe according to the present invention is constructed so that it permits omnidirectional movement of the tip of the stylus 4 relative to the machine head 6. The probe has internal means for sensing the extent of this movement in terms of a coordinate axis system which is determined by the probe's mechanical structure and is not coincident with the machine's coordinate axis system. Readings from the probe can be resolved mathematically by a computer 15 into the three orthogonal directions of the machine's coordinate axes.

Details of the probe are shown in FIG. 2. It has a housing 16 which is rigidly mounted on an adapter or coupling 18 which, in turn, is rigidly connected to the head 6 of the coordinate measuring machine. The housing 16 has a top piece 20 and a square tubular body 22 which comprises the four side walls of the housing. The housing 16 is connected to the adapter by a base plate 24 which also defines the lower wall of a space 26 where the probe's electronic circuit components are located.

Protruding below the lower end of the housing 16, there is a stylus receiving mount 28 which carries a plurality of internally threaded collars 30 which provide couplings for connecting a stylus 4 to the probe. As shown in FIG. 2, a stylus 4 with a ball tip 32 is threaded into a collar 30 which is concentric with the z-axis of the probe. Depending upon the task to be performed by the probe, styli can be attached to any of the unoccupied couplings, eighteen of which are provided on the mount 28.

The stylus receiving mount 28 and thus the stylus 4 are movable with respect to the housing 16, adapter shaft 18, and machine head 6. This movement takes place along three predetermined repeatable nonlinear paths. Each of these paths is established by one of the motion guiding devices 34, 36 or 38. Each of these devices has a lower member which is movable relative to its upper member, and the devices are connected together in series in that the x-axis device 34 has its lower member connected to the upper member of the y-axis device 36. The y-axis device, in turn, has its lower member connected to the upper member of the z-axis device 38. Due to this arrangement, the movement of the stylus tip relative to the coupling shank 18 is the sum of the movements experienced by the three devices 34, 36 and 38.

A preferred and novel form of motion guiding device is a flex wire mechanism. Details of the z-axis flex wire mechanism 38 are shown in FIGS. 3, 4, and 5. It has a generally cubic shape, and its side walls are formed of two members 40 and 42, both of which have an L-shaped horizontal cross section; i.e., each member is an angle formed of two mutually perpendicular legs. The upper or first member 40 is affixed to and supported by the y-axis device 36, and the lower or second member 42 is movable relative to the first member 40 in a predetermined direction which is repeatable, precise, nonlinear, and lies approximately in a vertical or z-axis direction.

The precision and repeatability of the relative motion between the members 40 and 42 is due to the use of a group of connector elements, preferably resilient wires of fixed lengths, which each have one end portion connected to the member 40 and one end portion connected to the member 42. FIG. 5 shows the manner in which each wire has one end clamped to the member 40 by a clamping bar 44. Similar clamping bars are shown in FIG. 2 for connecting the other ends of the wires to the member 42.

The wires are arranged in two nonparallel sets, with each set having at least three wires. In the illustrated embodiment, four wires 46 extend in an x-axis direction as one set, and four wires 48 extend in a y-axis direction as another set. The wires 46 restrain movement of member 42 relative to member 40 to movement which is transverse to the longitudinal axes of the wires 46, whereas the wires 48 restrain movement of member 42 relative to member 40 to movement which is transverse to the longitudinal axes of the wires 48. The transverse movement in each case is arcuate, this movement being generally spherical for small displacements and tending toward a parabolic form for larger displacements. Due to the presence of the two motion restraining means, the movement of the member 42 relative to the member 40 will be limited to a single arcuate path which is transverse to the longitudinal axes of all of the wires 46 and 48, i.e. the wires in both wire sets. In the flex wire mechanism of FIG. 2, a projection of this single arcuate path is shown with exagerated curvature by the arrow 50, and it will lie in a vertical plane which is displaced at 45° to the x-axis and y-axis.

There is normally a spacing between the members 40 and 42. In the illustrated embodiment, this spacing takes the form of two narrow gaps 52 and 54 which can be seen in FIGS. 3 and 4. Across these gaps, the end surfaces of the legs of member 42 confront the inside faces of the legs of the member 40. Although these confronting surfaces are normally spaced apart across the gaps they will, due to the fixed length of the wires, move toward each other when the member 42 moves vertically relative to the member 40. At a predetermined point of this movement, these surfaces will come into contact, and this acts as a stop to prevent any further relative movement between the members of the z-axis device 38. This condition is shown in FIG. 6 where the surfaces 56 and 58 have engaged each other. This drawing also shows that each wire has a very shallow compound S-shaped curvature in the respect that the elongated midportion of the wire is flexed downwardly from the member 42 and is flexed upwardly from the member 40. This flexion is well below the elastic limit of the spring wires 46 and 48, so the resiliency of the wires will return the members toward their original positions when any external force is removed from the members 40 and 42.

In order to detect changes in the position of the mount 28 relative to the probe's mounting shank 18, each of the flex wire mechanisms 34, 36 and 38 is provided with a position sensing means which operates between its upper and lower members. A preferred and novel position sensing means is a differential photonic divergence transducer. Such a device, shown in FIG. 7, has two infrared light emitting diodes 72 and 74 which are light sources, and two photodiodes 76 and 78 which act as light sensors. Both light sensors are mounted on the member 40 by a piece 79 which is rigidly connected to the member 40. The light sources 72 and 74 face away from each other in opposite directions so that the beam 80 from the diode 72 is directed upwardly and the beam 82 from the diode 74 is directed downwardly. The two light sensors 76 and 78 are affixed to the member 42 of the z-axis flex wire mechanism 38, and these photodiodes face in opposite directions toward each other where they will receive the beams of infrared light from the diodes 72 and 74. The upper sensor 76 is mounted on a tongue 84 which is integral with one of the wire clamping bars 44. The lower sensor diode 78 is mounted on a tongue 86 which is integral with another wire clamping bar. The configuration of this tongue 86 is shown in FIG. 4.

As can be seen in FIG. 7, time arrangement of the light sources and sensors is such that any vertical relative movement between the members 40 and 42 will shorten one beam 80 or 82, and lengthen the other beam, thereby changing the differential between the voltage signals produced by the photodiodes 76 and 78.

The principal electronic components of the apparatus include a circuit board mounted in the compartment 26 of the probe, a personal computer system 17, a custom interface board which is plugged into an expansion slot in the bus of the computer, and a commercially available analog-to-digital (A/D) board which is also plugged into an expansion slot.

A circuit schematic is presented in FIG. 8 wherein components for the x-axis, y-axis and z-axis measurements are assigned suffixes which correspond to their respective axes. For example, the x-axis unit 34 shown in FIG. 2 has two light emitting diodes which are identified in FIG. 8 as 72x and 74x. The diodes are disposed relative to each other in the manner shown in FIG. 7. In FIG. 8, the symbolic prefix "#" represents pins in the connectors between the probe-carried circuit board and the computer-mounted interface board; and, the prefix "CH" designates conductors which extend between the interface board 102 and the A/D board 106.

The probe's internal circuit board 90 carries the circuitry shown in box 90 in FIG. 8. The output of each photodiode is filtered by one of the R-C circuits 92x, 92y or 92z which perform low level signal filtering, and the filtered output is connected to either pin 1 or pin 2 of a differential amplifier integrated circuit 94x, 94y or 94z. A suitable differential instrumentation amplifier is designated AD-524 by its supplier, Analog Devices, 2 Technology Way, Norwood, Mass. 02062. Each of these combines or compares the filtered output of the two photosensors of one of the devices 34, 36 or 38, essentially performing a subtractive operation to produce an internal signal which is the differential between the two input signals, and then amplifies this differential to produce an amplified analog output signal. The instrumentation amplifiers 94 are adjusted so that their outputs will be from plus 12 to minus 12 volts in response to displacements of ±0.125 inch The output signals are carried from the probe to the computer by a shielded cable containing three wires 96x, 96y and 96z, and these signals indicate the positions sensed respectively by the x-axis device 34, the y-device 36 and the z-axis device 38.

The shielded cable with the conductors 96x, 96y and 96z leads from the probe 2 to the interface board 102 which is plugged directly into an expansion slot of the computer's bus. The circuit components of the interface board are illustrated in box 102 of FIG. 8. Secondary filtering of the output signals from the differential amplifiers 94 is performed by the R-C circuits 104x, 104y and 104z, and these secondarily filtered analog signals are then fed to the analog-to-digital converter which is shown in block diagram form at 106. A suitable A/D converter is designated DT2801/5716 and is available from Data Translation, Inc., 100 Lock Drive, Marlborough, Mass. 01752 and is described in their publication UM-00666-d1855. Conductors 108x, 108y and 108z carry the digital output signals to the computer's resident circuitry which, using suitable software, provides an output or readout signal which indicates the relative positioning of the two relatively movable members of each device 34, 36 and 38 along true, not approximate, x, y and z axes.

Another function of the interface board 102 is to distribute power from the computer to the diodes of the probe 2. A conductor 110 carries a negative five volts which is coupled to the light emitting diodes 72x, 74x, 72y, 74y, 72z and 74z by fixed resistors 112 and potentiometers 116. The potentiometers provide an analog adjustment to change the intensity of the infrared radiation sources, i.e. the diodes 72 and 74. Such adjustments may be made to compensate for performance variations between different diodes, and to bring the mechanical and electronic zero points into coincidence. A conductor 120 carries a negative 5 volts to the R-C filters at the inputs of the differential amplifiers 94x, 94y and 94z.

The probe can be furnished to a customer with a kit which includes the probe 2, a set of styli 4 for performing a variety of tasks, a computer, cabling for connecting the probe to the computer, and a floppy disk which has the software for the computer.

The probe 2 and a stylus 4 are mounted on the machine, the software is loaded into the computer, the probe is electronically connected to the computer by the cable, and a calibration routine is followed to provide the computer with data which permits it to make a map or formula which correlates the probe signals to the actual displacements experienced by the stylus during calibration. Calibration is performed in a manner which includes all internal effects of the probe and deflection characteristics of the stylus, shanks and extensions.

One acceptable calibration routine is performed while the stylus tip is held stationary by seating it in a conical recess. The probe-supporting head 6 is moved to many positions within the desired range in the x, y and z directions. At each of these positions, the probe signals are recorded in the computer's internal memory, and they may also be saved to a disk. Readouts from the machine's scales 11, 13 and 15 are also recorded, and these readouts are the values of delta x, delta y, and delta z.

A preferred calibration routine is performed with a precision workpiece which is placed on the work supporting surface of the coordinate measuring machine. A precision ring or sphere is suitable. The machine is operated to move the probe to many work-contacting positions. Multiple readings are taken. If the workpiece is a sphere, its true center is determined. A best fit sphere routine is used so that the relative offsets between a number of the probe tips 30 may be determined. The diameters of the precision sphere and a spherical stylus tip are known and constant, so the center-to-center distance is constant regardless of the location where the probe tip contacts the workpiece. This makes it possible to obtain a delta x, y or z by subtracting the measured radius from the actual radius, and then breaking down that value by the surface normal components. The delta values thus obtained are similar in magnitude to the values found by using the conic seat calibration routine described in the preceding paragraph.

Each calibration routine described above generates a 6×10 matrix of probe head readings. This matrix includes ten lines of readings which correspond to ten different positions of the probe stylus mount 28 relative to the machine head 6. Three columns of the matrix have the coordinate positions sensed by the three position sensing devices on the probe, and three columns have similar readings in the "fine" or high resolution mode. This matrix and values representing the probe's displacement as sensed by the scales which read the probe head position are used to construct a mathematical model for translating or converting the three probe signals into the machine's linear coordinate displacement values x, y and z.

The computer software maps the analog output from the probe to the digital reference axes of the coordinate measuring machine. It converts the digitized version of the probe's analog output into x, y and z displacement values by use of a three dimensional mathematical model. The computer does the decoding and scaling operations, performs communications, updates the display, and it also performs operator interaction when in a manual operation mode. It can be interfaced to communicate with the controller of the coordinate measuring machine or other host machines.

A preferred method of modeling is a multiple linear regression technique which uses readings received from the machine and probe during calibration to quantify constants which are unique to the particular setup. The formulae are as follows wherein x, y, and z are the distances the probe tip is displaced from its zero or neutral position according to the scales of the coordinate measuring machine; and a, b and c are the displacements sensed by the optical sensors along their respective axes:

$\Delta x = k1 + (k2 \cdot a) + (k3 \cdot b) + (k4 \cdot c) + (k5 \cdot a^2) + (k6 \cdot b^2) + (k7 \cdot c^2);$
$\Delta y = k1' + (k2' \cdot a) + (k3' \cdot b) + (k4' \cdot c) + (k5' \cdot a^2) + (k6' \cdot b^2) + (k7' \cdot c^2);$
$\Delta z = k1'' + (k2'' \cdot a) + (k3'' \cdot b) + (k4'' \cdot c) + (k5'' \cdot a^2) + (k6'' \cdot b^2) + (k7'' \cdot c^2).$ Using the values of a, b and c found during calibration, the formulae are solved to find tile constants k. These constants are then inserted in the formulae, thus enabling the computer to translate the values of a, b and c into linear values aligned precisely with the axes of probe head movement.

The readout can be in the form of visual display on the computer monitor. Simply by changing the gain of the A/D converter 106, which can be performed by signals from the computer, the readout can be either provided in a regular scale and resolution, or in a fine scale and resolution. On the regular scale, a suitable active range is ±2.5 mm, and the resolution is 0.07um. On the fine scale, the active range is ±0.3 mm and the resolution is 10 nm. By taking multiple readings and averaging them, higher resolutions are available.

From the foregoing, persons familiar with the field of the invention will recognize that the invention provides a new and useful method and apparatus. Persons skilled in the art will recognize that the invention may be practiced by devices and procedures which differ from the preferred embodiments described herein. Therefore, it is emphasized that the invention is not limited to the preceding disclosure, but embraces a wide variety of apparatuses and methods which fall within the spirit of the following claims.

I claim:

1. A method of measuring with a coordinate measuring apparatus which has a movable head, a probe rigidly affixed to the head, and a stylus with a workpiece-contacting tip supported by the probe, said probe having members which are movable relative to each other and are arranged to enable the tip of the stylus to move relative to the head in at least two directions, said apparatus including at least two signal generating means for producing signals which represent displacements of the stylus relative to the head, displacing the tip of the stylus relative to the movable head of the apparatus by a known displacement which has a known distance and a known direction, said method including the following steps:

producing with said signal generating means a set of sensed values for said known displacement, repeating said displacing step and said producing step to obtain sets of sensed values for a plurality of known displacements, producing a mathematical model from said sets of sensed values and said known displacements, measuring a workpiece by moving said tip into contact with the workpiece so that said signal-generating means produces a set of measurement signals, and determining the distance and direction of tip displacement occurring during said measuring of said workpiece by correlating the set of measurement signals to said mathematical model.

2. A method according to claim 1, wherein the tip is simultaneously moved relative to the head in three directions, and the production of the mathematical model is performed by modelling simultaneously all three directions of tip movement.

3. A method according to claim 2 wherein said directions are three mutually perpendicular directions.

4. A method according to claim 1 wherein the tip is simultaneously moved relative to the head in three mutually perpendicular directions.

5. A method according to claim 4 wherein the mathematical model is produced by simultaneously modelling with displacements in all three mutually perpendicular directions.

* * * * *